July 16, 1963 — C. E. WISTI — 3,097,373
LIFE LINE GRAPPLING HOOK AND MARKER
Filed March 20, 1962
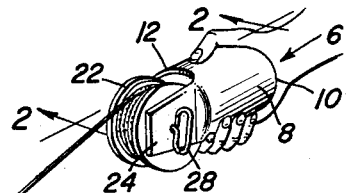
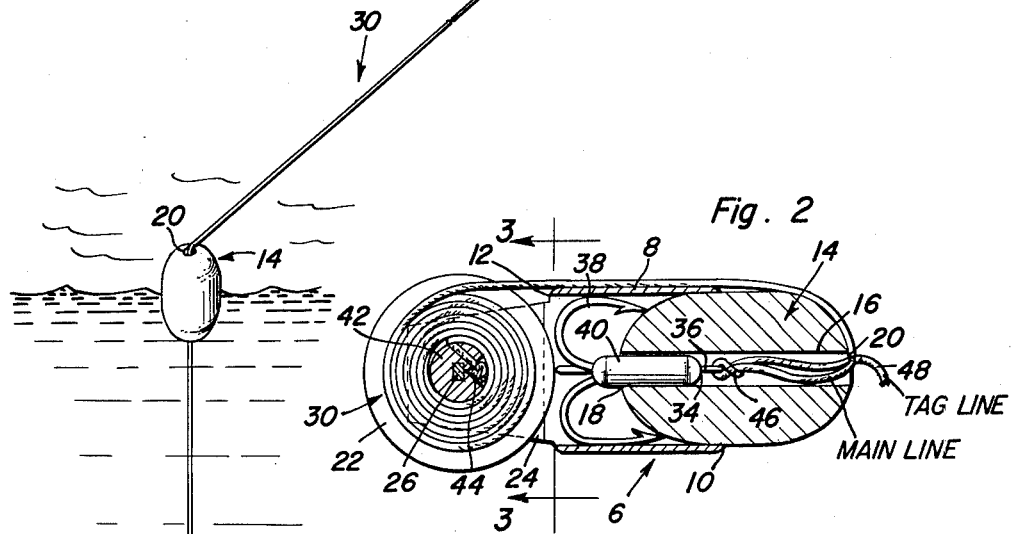
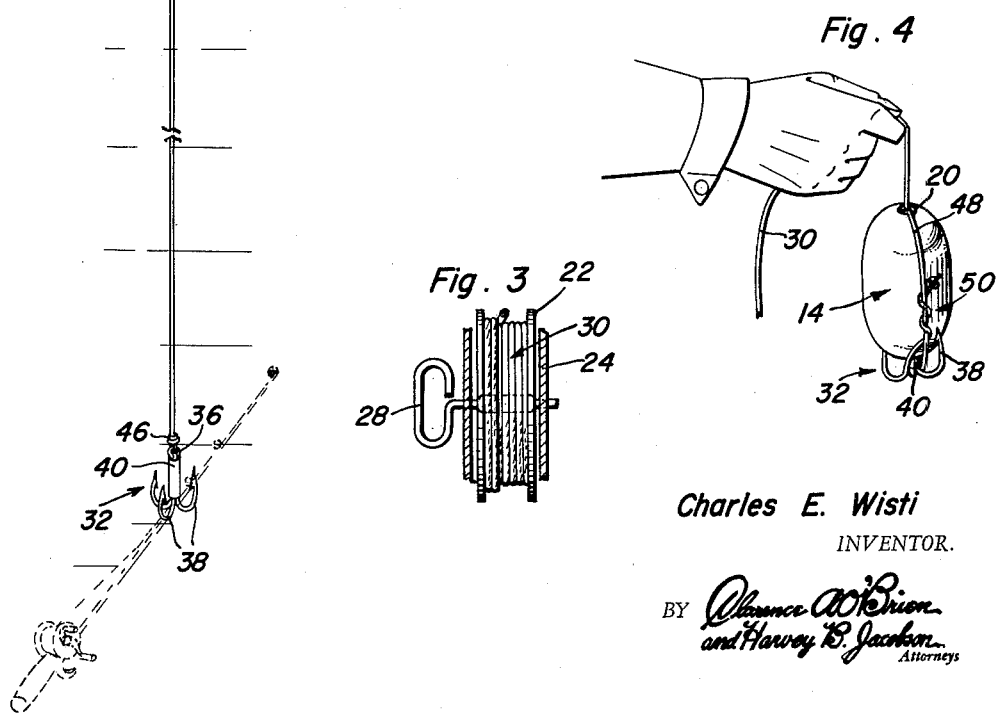
Charles E. Wisti
INVENTOR.

United States Patent Office 3,097,373
Patented July 16, 1963

3,097,373
LIFE LINE GRAPPLING HOOK AND MARKER
Charles E. Wisti, 2492 Broadway, North Bend, Oreg.
Filed Mar. 20, 1962, Ser. No. 181,107
7 Claims. (Cl. 9—9)

This invention relates to a manually usable multi-purpose device or contrivance which is novel in that it may be readily and satisfactorily used, in the case of an emergency, to rescue a person in danger from a body of water, used as a marker buoy, or equally well used to retrieve submerged or underwater objects, for example, a fishing rod or the like.

Briefly, the invention comprises a life line, specially constructed grappling means carried by the free end of the line, a complemental float having a passage for the line, and a holder equipped with a spool for paying out the line, said holder having a novel hollow handle providing a receiver in which the float and grappling means or device may be compactly and safely stored when not being used.

More specifically, the above-named holder is such in construction that it may be carried in the glove compartment of an automobile, in a tackle box, or in a survival kit, for example, a type of kit used by members of the armed forces. To this end the holder embodies an open-ended sleeve one end of which is equipped with the line storing reel or spool, the other end defining a socket-like receiver for housing the float and complemental hook-equipped grapple in a safe and practical manner.

The invention features an egg-shaped float (or buoy) which is amply large that it may be securely caught hold of by a victim in a manner to be pulled ashore or aboard with the aid of the life line. The bore or axial passage in the float serves to accommodate a suitably designed lead or an equivalent weight which is provided on the shank of the grappling means, and when the weight is located in the passage and held by a tag line (hereinafter described) the weighted float can then be thrown out by the user (using a heaving line technique) to the person to be pulled to safety.

The invention also features a grapple comprising a shank having a line eye at one end, a plurality of barbed drag-type hooks at the other end and a lengthwise weight encasing the shank and which is proportional with the bore in the float for retention therein when being stored or when the float is heaved by the rescuer, said weight also serving as a sinker and anchor for the line.

Then, too, the holder is unique in that the sleeve has ears at one end to support the spool, the receiver being such that the float is telescoped therein with the weight in the bore and with the barbed ends of the hooks abutting the adjacent end of float in a shielded and safeguarded manner.

Also, and as will be more fully understood for the following disclosure, the weighted grappling hooks may be dropped below the float and the line payed out by way of the float to drag for and retrieve a sunken object such as reel-equipped fishing rod, a valuable plug, lure or the like.

Further the instant concept is meritorious and objective in that with this simple but unique contrivance in hand a user thereof has at his disposal a practical means to cope with an unexpected emergency, a means which becomes a reasonably reliable aid when undertaking to save a life. Experience in actually using the invention has proved its worth time and again. Accordingly, the present invention may be properly categorized, in part, as a practical contribution to the fields of endeavor in which it serves its intended purposes.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective showing the invention and the manner in which it is constructed and how it may be successfully used as a retrieving device for a sunken or underwater object;

FIGURE 2 is a view in section with parts in elevation taken approximately on the plane of the line 2—2 of FIGURE 1 and on a larger scale and wherein the component parts are stored in a manner to provide a compact and convenient ready-to-use device or contrivance;

FIGURE 3 is a cross-section on the section line 3—3 of FIGURE 2; and

FIGURE 4 is a view in perspective showing the manner in which the float or buoy is rigged, using a timber-hitch and illustrating how the line is caught hold of preparatory to heaving the buoy in order that it may then be used as a simple lifesaving means.

Starting first with the assembled ready-to-use device or contrivance the aforementioned holder is designated by the numeral 6. It comprises a hollow cylindrical handle, more specifically, an open-ended sleeve 8 one open end of which is denoted at 10 and the other open end at 12. This sleeve constitutes a socket-like receiver which functions in the manner illustrated in FIG. 2. This is to say the receiver serves to telescopically and frictionally receive an approximate one-half portion of an elongated or egg-shaped float or buoy 14. This buoy or float has an axial bore extending therethrough which is referred to as a passage 16. One end portion of the passage is denoted at 18 and the other end portion at 20. Formed integrally with and projecting beyond the end portion 12 is the means for removably and rotatably supporting the spool or reel 22. More specifically this means comprises a pair of outstanding spaced parallel ears 24 mounted on a shaft 26 having end portions journaled in appropriate bearings in the ears with the shaft provided at one end with a fingergrip 28 which assists in reeling or winding the line 30 thereon in the manner shown in FIGS. 1 to 3.

The grapple or grappling means is denoted generally by the numeral 32 and comprises a shank 34 provided at one end with a line-attaching eye 36 (FIG. 2). The shank is provided at the opposite end with a plurality of radial circumferentially spaced barbed retrieving hooks 38. That portion of the shank between the hooks and eye is provided with an elongated lead or an equivalent weight 40 which serves as a line sinker and also anchor. One end of the line is secured to the hub 42 of the spool as denoted at 44. The other end of the line is tied as at 46 to the eye 36. An extended end portion of the line (the same line or a separate piece if desired) and denoted at 48 constitutes the aforementioned tag line. It should be noted in this connection that the weight 40 is such that it may be telescoped into the end portion 18 of the float's passage, this in a manner to position and safeguarded the pointed barbs against the convex end portion of the float in the manner illustrated. The end portion of the tag line is broken away in FIG. 2 to clarify the illustration which this view provides.

Assuming that one desires to use the invention as a retriever for a lost or submerged object (the fishing rod in FIG. 1) it will be evident that the grapple-equipped float is withdrawn from its socket or receiver whereupon the sleeve becomes a satisfactory handgrip in the manner shown. When the weighted float is cast or thrown out and when it lands on the water surface it will be obvious that the weighted grapple descends during which time the line 30 is payed out by the spool and slides downwardly through the passage in the float. The rotation of the spool may be stopped by the user's finger at the desired time and the dragging and fishing step then undertaken. The grapple means may be maneuvered into position and the rod caught hold of and pulled up by reeling in the line in an evident manner. The float also serves in this instance and in other similar instances as a spot marker buoy.

When using the device for a life line or life saver it should be employed in the manner illustrated partly in FIGURE 4. While in this view the holder and spool is not shown it is to be pointed out that in practice the user will catch hold of the holder or handle in the left hand and use the right hand to heave the float and grapple assembly out and into the water as near as possible to the overboard victim to be pulled in by the life line. It is at this time that the tag line 48 is necessarily passed through the passage in the buoy or float in the manner illustrated, the free end thereof being carried around the hooked end of the grapple means and then temporarily but releasably secured in place by a timber hitch as at 50. The weighted grapple means assists in throwing the buoy out and then the buoy becomes a means to be caught hold of by the victim so that he may be pulled ashore or aboard by the holder of the life line.

A careful consideration of the views of the drawing, the description thereof and the invention as claimed will enable the reader to obtain a clear and comprehensive understanding of the subject matter and features and advantages and mode of use. Therefore, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in retrieving an object submerged in a body of water; manually usable retrieving means comprising a float having a line passage extending axially therethrough, a retrieving line having a portion passing slidingly through said passage, a grapple means embodying a shank provided at one end with radial circumferentially spaced hooks, provided at the other end with an eye to which an end of the line is connected, and an elongated weight carried by and surrounding said shank between the eye and hooks, said weight being of a cross-section that it is adapted when not in use to fit telescopingly in an end portion of the passage in said float with the terminals of the hooks abutting an end of the float, a spool on which said line is adapted to be wound, and a handle-equipped holder for said spool and also said float, the size and radial spread and circumferential spacing of said hooks being such that said terminal ends embrace the cooperating end portion of the float in a safeguarded manner.

2. For use when undertaking a rescue and lifesaving task; a rescue device comprising a hand-sized float having a line passage extending axially therethrough, a weighted shank extending into one end portion of said passage, said shank having hooks at an outer end abutting an end of the float, a lifeline extending into the other end portion of said passage and attached to said shank, and a tag line also connected to said shank, wound around the float and temporarily connected to an exterior surface of the float by a timber hitch.

3. A multipurpose device comprising, in combination, a manually usable holder embodying an open-ended sleeve defining a hollow handle and also a float encasing and temporary storing receiver, said sleeve provided at an outer end with a freely rotatable spool, a float having a substantial portion thereof snugly but removably fitted in said receiver, said float having an axial passage for a line, a shank having a weight thereon telescoping into an inward end portion of said passage, said shank being provided with a plurality of barbed hooks with the barbed ends abutting an adjacent cooperating end of the float, and a lifeline wound on said spool and having an end portion entering an outer end portion of the passage in said float and connected to an eye provided therefor on said shank, and a tag line having an inner end connected to said eye and an outer free end portion passing outwardly of the outer end of the passage and temporarily and separably connectible to said shank.

4. A multipurpose device comprising, in combination, a float having an open-ended line passage therethrough, a line passing freely through said passage, grappling means carried by a free outer end of said line, and a holder for said float having a freely rotatable spool on which the inner end of said line is wound and from which the line may be unwound and payed out for use, said holder embodying handle means, said handle means embodying a sleeve open at an outer end and defining a pocket-like receiver and retainer for said float and permitting a substantial portion of the float to be fitted telescopically and retentively stored therein when said float is not being used, said grappling means embodying a plurality of retrieving hooks mounted on a shank, said shank having a line-attaching eye and being provided between the hooks and eye with a weight.

5. The structure according to claim 4, and wherein said float is of a size in both length and cross-section to be readily caught hold of and securely held by an average human hand, whereby to adapt itself for rescue and life-saving needs and also for easy-to-see use when employed as a marker buoy for submerged article-retrieving needs.

6. A multipurpose device comprising, in combination, a relatively short open ended sleeve circular in cross section and provided at one end with a pair of spaced parallel outstanding ears, a line winding spool situated and mounted for free rotation between said ears, that portion of the sleeve which projects beyond corresponding inner ends of said ears constituting and providing a receiver and retainer, a hand-sized float having a line passage extending axially therethrough, a substantial portion of one end of said float being fitted telescopically into and held frictionally in said receiver and retainer, grappling means comprising a shank provided at an outer end with a plurality of circumferentially spaced pronged hooks embracing and abutting a cooperating end of said float, the shank of said hook projecting telescopically into the passage of said float, and a line having one end attached to and wound on said spool and having the other end entering an outer end of the passage insert float and extending through said passage and being connected with said shank.

7. The structure defined in claim 6 and in combination a tag line having an inner end connected to said shank, a portion thereof passing outwardly through and beyond the passage in said float, said tag line being adapted to be temporarily connected to a cooperating portion of said grappling means by way of a releasable timber hitch.

References Cited in the file of this patent

UNITED STATES PATENTS

| | | |
|---|---|---|
| 782,067 | Shelby | Feb. 7, 1905 |
| 946,789 | Franz | Jan. 18, 1910 |
| 1,403,362 | Walters | Jan. 10, 1922 |
| 2,465,744 | Olender | Mar. 29, 1949 |
| 2,645,051 | Stofleth | July 14, 1953 |